(No Model.)

A. H. HIEATZMAN.
MEAT HANGER.

No. 511,238. Patented Dec. 19, 1893.

Witnesses:
Wm. A. Schoenborn.
Wm. M. Wishart.

Inventor:
A. H. Hieatzman
pr S. Brashears
Attorney

THE NATIONAL LITHOGRAPHING COMPANY,
WASHINGTON, D. C.

UNITED STATES PATENT OFFICE.

ARTHUR H. HIEATZMAN, OF BALTIMORE, MARYLAND, ASSIGNOR OF ONE-HALF TO ALFRED BROWN, GEORGE R. WANNENWETSCH, AND HARRY D. HIEATZMAN, OF SAME PLACE.

MEAT-HANGER.

SPECIFICATION forming part of Letters Patent No. 511,238, dated December 19, 1893.

Application filed April 4, 1893. Serial No. 468,976. (No model.)

*To all whom it may concern:*

Be it known that I, ARTHUR H. HIEATZMAN, a citizen of the United States, residing at Baltimore city, in the State of Maryland, have invented certain new and useful Improvements in Meat-Hangers; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to meat hangers and has for its object to improve their construction and operation and furnish the trade with a hanger which, while far superior to those now in use, shall be cheap enough to permit of their use wherever cords are now used.

In stringing the meat as it is commonly called, after the cord has been drawn through by a needle or puncturing instrument, its ends are tied together forming an unsightly knot with ends projecting therefrom. The hole through which the cord is drawn must always be considerably larger than the diameter of the cord, leaving an opening in the meat after the cord is inserted, which opening attracts flies and other insects. The cords are further objectionable as they are generally of hemp, tarred in order to give strength, and such tarred cord emits a disagreeable odor and has a bad taste. The cord and opening as before stated are injurious to the meat and the meat turns dark and becomes unpalatable on account of its becoming impregnated with a taste of tar. The process of stringing is also slow and tedious on account of the different steps to be taken viz:—puncturing, drawing the cord through, and tying the cord. In hanging the meat the two stretches of the cord above the meat often stick together, especially after having been immersed in warm water, which retards the work. The cords can be only used once for the reason that they cannot be readily removed from the meat without cutting or breaking.

The object of my invention is to furnish a hanger which shall overcome these defects and to strengthen and generally improve such devices and with this object in view, my invention consists in the improved construction, arrangement and combination of parts hereinafter fully described and afterward specifically pointed out in the claims.

Figure 1:
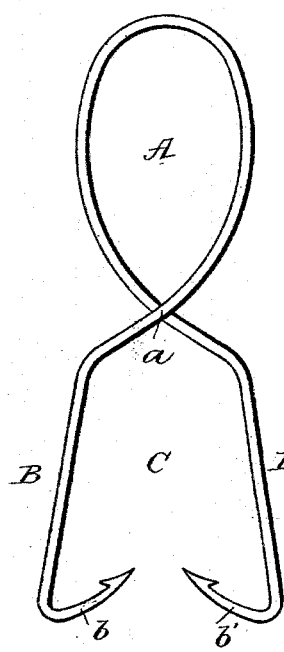
Figure 3:
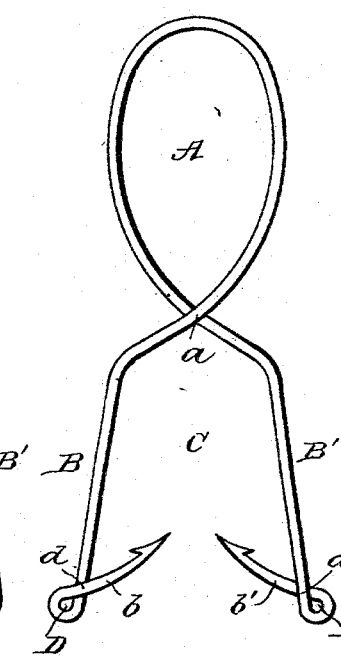
Figure 5:
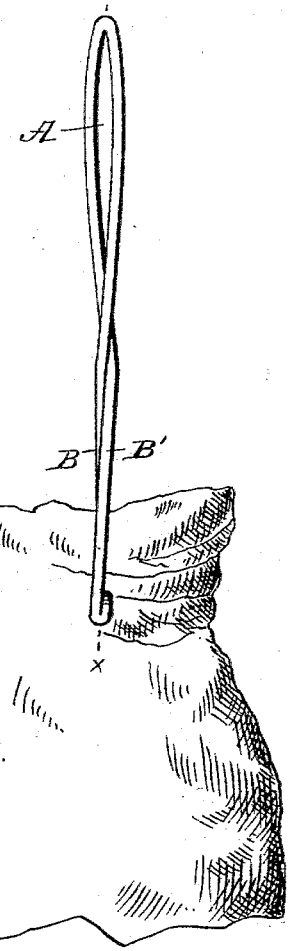
Figure 2:
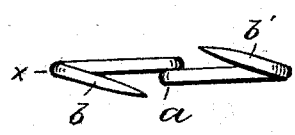
Figure 4:
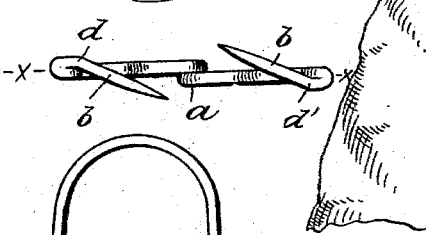
Figure 7:
Figure 6:
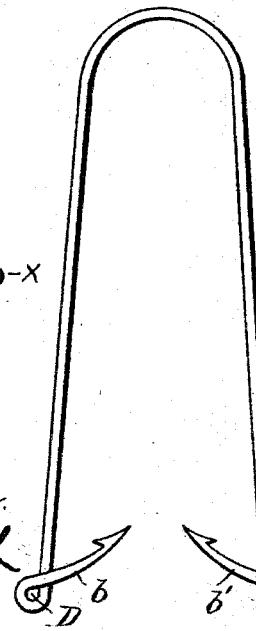

In the accompanying drawings Figure 1 is a view, in side elevation, of a meat hanger embodying some of my improvements. Fig. 2 is a bottom plan view of the same. Fig. 3 is a view, in side elevation, of a meat hanger embodying all my improvements. Fig. 4 is a bottom plan view thereof. Fig. 5 is an edge view of the same, in a ham ready for hanging, and Figs. 6 and 7 show another form of hanger, without the crossing in the center.

Like letters of reference mark the same parts in all the figures of the drawings.

Referring to the drawings by letter A is the upper or main loop of a meat hanger which is formed by bending a piece of elastic metal, such as spring wire. The ends of the wire of which the loop is formed are crossed at $a$ and extended downward, the end B passing over or on top of the end B' at the crossing point, as seen in Figs. 1 and 3, or the end B passing to the right of the end B' as seen in Figs. 2, 4 and 5, the two ends being formed into a lower loop C. At the lower ends $b$ $b'$ these wires B, B' are sharpened and bent inward toward each other and slightly upward, the points being placed at inclinations to the plane of the main body of the hanger as indicated by the dotted line $x$—$x$ in Figs. 2, 3 and 5, the point $b$ being inclined to the left of said plane and the point $b'$ to the right thereof, as clearly shown. These points may be simply turned inward, to their proper positions as shown in Figs. 1 and 2, but I prefer to form them as shown in Figs. 3, 4, 5, 6 and 7 in which the ends B, B' after crossing each other at $a$, are bent outward, upward and then inward, forming loops D, D', the loop D being formed in wire B and the loop D' in wire B'. In bending the wire B to form the loop D, its end $b$ is placed, at its crossing point $d$, on the same side of the wire B as the wire B is placed, at the point $a$, where it crosses wire B', and from the crossing point $d$, the point $b$ is bent against and curved slightly beyond wire B to the upward and sidewise inclined position which it is to maintain, as hereinbefore described. The same method is used in forming loop D' out of wire B'. The points $b, b'$, may be provided with barbs as shown in Figs. 1 and 3 to more thoroughly secure the ends against accidental withdrawal from the meat while it is being handled.

The operation of my invention may be described as follows:—It being desired to insert the hanger into a piece of meat, it is grasped by the upper loop A, and by pressing the sides thereof toward each other, the lower loop C is enlarged, the points $b$ and $b'$ receding outward, away from each other. When they are far enough apart, they are passed over one edge, side or end of the meat and pressure upon the sides of loop A is relieved. The elasticity of the metal composing the hanger then causes the points $b, b'$ to approach each other and slightly enter the meat. If desired, these points are then pressed toward each other and deeply into the meat, but this is not necessary owing to the upward inclination of the points. When the points have thus slightly entered the meat, it is only necessary to place the finger in the upper loop and proceed to lift the meat by the hanger. This will force the point deeply into the meat and all danger of accidental displacement of the hanger will be obviated by the barbs. As the points $b, b'$, pass into the meat, they, by virtue of their positions at opposite inclinations to the plane of the main body of the hanger, have a wedge action and a strong normal tendency to keep the wires B, B', tightly in contact at the point $a$ where they cross each other, thus firmly keeping the loops A and C intact, and prevent injury to the hanger by parting these wires at the point $a$. This is a very essential feature as the hangers would be well nigh inoperative were the points set at inclinations opposite to those described, in which latter mentioned positions they would cause the wires B, B' to separate at their point of crossing when the weight of the meat was imposed upon the hanger.

In Figs. 6 and 7 I show a modified form of hanger provided with the loop turned ends, as in Figs. 3, 4 and 5, without the crossed wires in the center of the hanger.

Having thus fully described my invention, what I claim as new, and desire to secure by Letters Patent, is—

1. A meat hanger formed of spring wire, having its lower ends bent outwardly and upwardly to form loops and thence inwardly, terminating in oppositely located, sharp puncturing points, as set forth.

2. A meat hanger formed of spring wire, having its lower ends bent outwardly and upwardly to form loops and thence inwardly, terminating in oppositely located, sharp puncturing points said points being provided with barbs, substantially as set forth.

3. A meat hanger consisting of spring metal bent to form a loop, the ends crossed and passing beyond the loop and being provided with outwardly and upwardly turned small loops and opposite inwardly pointed sharp ends, as set forth.

4. A meat hanger consisting of spring wire bent to form a loop, the ends passing beyond the loop and crossed and being provided with inwardly turned pointed ends, one of said pointed ends being inclined away from the plane of the main body or loop of the hanger in one direction and the other end similarly inclined in the opposite direction as and for the purposes set forth.

5. A meat hanger consisting of spring metal bent to form a loop, the ends crossed and passing beyond the loop and being provided with outward and upwardly turned small loops and opposite inwardly pointed sharp ends, one of said pointed ends being inclined away from the plane of the main body or loop of the hanger in one direction and the other end similarly inclined in the opposite direction, as and for the purposes set forth.

6. A meat hanger consisting of spring metal bent to form a loop the ends crossed and passing beyond the loop and being provided with outwardly and upwardly turned small loops and opposite inwardly pointed sharp ends, one of said pointed ends being inclined away from the plane of the main body or loop of the hanger in one direction and the other end similarly inclined in the opposite direction, the wire of which each of these loops is formed being so turned as to pass on the same side of the wire of which it is formed as said wire passes its fellow wire at the central point of crossing as and for the purposes set forth.

In testimony whereof I affix my signature in presence of two witnesses.

ARTHUR H. HIEATZMAN.

Witnesses:
GEO. R. WANNENWETSCH,
GEO. H. SIEGEL.